(12) United States Patent
Huang (10) Patent No.: US 9,487,381 B2
(45) Date of Patent: Nov. 8, 2016

(54) ELECTRIC CAR JACK

(71) Applicant: Comeup Industries Inc., Taipei (TW)

(72) Inventor: Shih Jyi Huang, Taipei (TW)

(73) Assignee: Comeup Industries Inc., Taipei (TW)

( * ) Notice: Subject to any disclaimer, the term of this patent is extended or adjusted under 35 U.S.C. 154(b) by 0 days.

(21) Appl. No.: 14/713,111

(22) Filed: May 15, 2015

(65) Prior Publication Data

US 2016/0145084 A1    May 26, 2016

(51) Int. Cl.
| | |
|---|---|
| *B66F 3/08* | (2006.01) |
| *B66F 3/44* | (2006.01) |
| *B66F 3/16* | (2006.01) |
| *B66F 3/20* | (2006.01) |

(52) U.S. Cl.
CPC . *B66F 3/44* (2013.01); *B66F 3/16* (2013.01); *B66F 3/20* (2013.01)

(58) Field of Classification Search
USPC .......................................................... 254/103
See application file for complete search history.

(56) References Cited

U.S. PATENT DOCUMENTS

| | | | | |
|---|---|---|---|---|
| 1,404,862 A * | 1/1922 | Kirstatter | .................. | B66F 3/20 254/103 |
| 1,410,577 A * | 3/1922 | Kopf | ........................ | B66F 3/16 254/103 |
| 1,792,339 A * | 2/1931 | Weidner | .................. | B66D 1/14 254/103 |
| 1,811,629 A * | 6/1931 | Hott | .......................... | B66F 3/18 254/103 |
| 3,148,558 A * | 9/1964 | Stevens | ..................... | B66F 3/20 235/132 R |
| 3,888,464 A * | 6/1975 | Felsen | ....................... | B66F 3/44 254/425 |
| 4,749,169 A * | 6/1988 | Pickles | ..................... | B66F 3/12 254/122 |
| 4,775,132 A * | 10/1988 | Yang | ......................... | B66F 3/12 254/1 |
| 5,118,082 A * | 6/1992 | Byun | ........................ | B66F 3/20 254/102 |
| 5,992,826 A * | 11/1999 | Simmonds | ................ | B66F 3/16 254/103 |
| 2007/0210289 A1 * | 9/2007 | Drake | ....................... | B66F 3/16 254/103 |
| 2011/0024706 A1 * | 2/2011 | Schwindaman | .......... | B60S 9/12 254/93 R |

FOREIGN PATENT DOCUMENTS

SE      EP 2700608 A1 *   2/2014   ............... B66F 3/10

\* cited by examiner

*Primary Examiner* — Alvin Grant
(74) *Attorney, Agent, or Firm* — Alan D. Kamrath; Kamrath IP Lawfirm, P.A.

(57) ABSTRACT

An electric car jack includes a spindle, a second middle gear, an elastic ring, an upper lining, a third middle gear, a lower lining, an adjusting and positioning ring and a positioning screw ring that jointly form a torque limiting mechanism with a torque limitation effect and a positioning plate, a power gear, a brake disc, a disc tray, an output shaft and a latching member that jointly form a powerless brake mechanism with a ratcheted braking effect. Both torque limiting mechanism and powerless brake mechanism are compatibly installed in a reduction gear of the machinery part f the electric car jack to maximize their effects.

4 Claims, 8 Drawing Sheets

ELECTRIC CAR JACK

BACKGROUND OF THE INVENTION

1. Field of the Invention

The present invention relates to an electric car jack, in particular to the electric car jack with a torque limiting effect and a ratcheted braking effect.

2. Description of the Related Art

In the use of cars, a jack may be required for lifting a car compartment to a fixed position or height some occasions, such as hanging a camping compartment at the rear of a car for leisure activities in holidays, or driving the car to a camp site for camping. Leisure activities of this sort are very popular in countries with vast land (such as United States, Canada, Australia, etc). After a car with the camp compartment is driven to an appropriate camp site, the jack is generally used for lifting the camping compartment to facilitate users to camp in the camping compartment. In some cases, the camping compartment is disconnected from the car after the camping compartment is lifted, and then the car is driven to a parking lot other than the camp site. Since items required for wild life activities are stored in the camping compartment, and activities and sleeps are conducted in the car compartment, the jack must be able to support a very heavy weight.

For instance, a container truck carrying a container compartment is driven to a designation to load goods, and the loading generally takes some time, so that the towing engine of the container truck is usually driven away, and only the container compartment remains at the designation. Now, a jack is usually used for supporting and lifting the compartment, so that the jack is fixed at a fixed point to facilitate the job of loading goods. In addition, there are some other occasions that require the use of the jack to lift the compartment, but they are not described in details.

In the principle of operating a conventional electric car jack, a power source (generally a DC motor) installed in the jack is retarded by a retardation mechanism, and then a telescopic stand is driven to extend downwardly in order to lift the compartment in an opposite direction. When the power source is reversed, the telescopic stand will be retracted upwardly to descend the compartment slowly. During use, the electric car jack carries a heavy load, so that a torque limiting mechanism used for overload protection is generally installed in a machinery part of the jack, and the torque limiting mechanism will be idle to stop transmitting power whenever overload occurs, so that the transmission mechanism such as motor and retardation mechanism in the jack can be protected to prevent breakdowns and damages caused by overload. In the meantime, the jack further includes a powerless brake mechanism for braking the transmission mechanism of the jack immediately when the electric car jack stops at a predetermined height, and the electric car jack will remain at the predetermined height, so as to prevent accidents of dropping the container compartment unintentionally.

However, the torque limiting mechanism and powerless brake mechanism of the conventional electric car jack are usually two separate devices. For example, an over-current protector is used as the torque limiting mechanism and provided for increasing the current of the power source when the torque of the load increases, so that the power source is disconnected when over-current occurs, and the effect of limiting the torque is achieved indirectly. In addition, a conventional electromagnetic brake clutch is used as the powerless brake mechanism, and the over-current protector and the electromagnetic brake clutch are installed at different positions of the electric jack respectively, and such arrangement doubles the cost. Even worse, the two mechanisms may not be compatible with each other, and the application will not be smooth. After a long time of use, the components may be damaged easily. Furthermore, the application of the conventional electric car jack is inconvenient (as described below):

1. The electric car jack uses an over-current protector as the torque limiting mechanism, and an electromagnetic brake clutch as the powerless brake mechanism, and thus the car jack will be useless without a power supply. As the car is driven outdoors, the electric power storage capacity of the battery will become lower and lower after a long time of charging and discharging. In addition, the power source, over-current protector, and electromagnetic brake clutch require the utilization of electric power (particularly require high voltage at startup time). The car jack will be inoperable in the situation of low battery or insufficient voltage, and users will be crazy at the situation when the compartment is lifted and cannot be descended.

2. Both of the over-current protector and the electromagnetic brake clutch require some buffer time for shutdown and startup, and they cannot provide their respective functions immediately, so that the electric jack will stop the power transmission immediately whenever there is an intolerable overload or the electric jack cannot be stopped or braked immediately. In practical applications, when the compartment cannot be ascended anymore (or an overload occurs), the power output is not stopped immediately but the power is outputted continuously for a short period of time before stopping. When a user believes that the compartment is lifted to an appropriate height and presses the stop key, the power is still not stopped immediately, and the operation of the electric jack keeps operating for a small period of time before stopping. Obviously, the application of such electric car jack is very poor.

SUMMARY OF THE INVENTION

In view of the aforementioned drawbacks of the prior art, the inventor of the present invention based on years of experience in the related industry to conduct extensive researches and experiments, and finally developed the electric car jack to overcome the drawbacks of the prior art.

Therefore, it is a primary objective of the present invention to provide an electric car jack capable of installing components that produce a torque limitation effect and components that produce a ratcheted braking effect into a reduction gearbox of machinery parts to achieve the double effects of torque limitation and ratcheted braking simultaneously.

To achieve the aforementioned objective, the present invention provides an electric car jack, comprising:

a housing, having a telescopic stand extended downwardly from the housing; a machinery part, installed in the interior space of the housing, and comprised of a power source, a reduction gearbox and a controller; a chassis, formed by engaging an upper chassis and a lower chassis of the reduction gearbox, and the power source being coupled to the lower chassis, and an output shaft of the power source being coupled to a power shaft and extending into the lower chassis, and the power shaft having a first-section pinion disposed on a surface of the power shaft, and the controller being installed at the top surface of the upper chassis and electrically coupled to the power source, and the reduction gearbox having a retardation mechanism installed therein, characterized in that the retardation mechanism comprises:

a first middle gear, engaged and transmitted by the first-section pinion, and having a spindle installed between the upper chassis and the lower chassis, and a second-section pinion coupled to the spindle;

a second middle gear, engaged and transmitted by the second-section pinion, and having a spindle installed between the upper chassis and the lower chassis, and a thread section formed on a surface of a lower end of the second middle gear, and the spindle passing through a concave arc elastic ring and an upper lining after the spindle is passed into the second middle gear, and then the spindle passing through a third middle gear, a lower lining and an adjusting and positioning ring, and a positioning screw ring having a shaft hole with an inner thread and screwed with the thread section, and the adjusting and positioning ring having a plurality of positioning plates disposed at the external periphery of the adjusting and positioning ring and selectively deviated, and the positioning screw ring having a plurality of symmetrical positioning recess formed on the external periphery of the positioning screw ring;

a power gear, engaged and transmitted by the third middle gear, and having a shaft hole formed at the center of the power gear and an inner thread formed in the shaft hole, and a plurality of positioning plug holes formed on an upper surface of the power gear and arranged in a circular shape and provided for selectively plugging at least one positioning plunger;

a positioning plate, attached onto a top surface of the power gear, and having an angular perforation formed at the center of the positioning plate and at least one arc groove formed at the periphery of the positioning plate;

a brake disc, having a circular hole formed at the center of the brake disc, a ratchet disposed around the periphery of the brake disc and having ratchet teeth arranged in the same direction, and a lining separately attached onto both sides of the brake disc;

a latching member, positioned by plugging a shaft, installed at a side of the brake disc and fixed between the upper chassis and the lower chassis, and having a latching end always aligned towards the ratchet, such that the brake disc is capable of rotating in one direction only;

a disc tray, having a protruding base formed at the center of the disc tray and around a through hole, and the disc tray being attached onto a bottom surface of the brake disc, and the protruding base abutting the internal periphery of the circular hole of the brake disc; and an output shaft, having an upper section comprised of a thread section with an opposite outer thread and an angular member, and a lower section coupled to the telescopic stand, and the output shaft extending from a through hole formed at a bottom side of the lower chassis and passing through the through hole in the protruding base of the disc tray, and then the thread section being screwed and coupled with the shaft hole of the power gear, and the angular member entering into the angular perforation of the positioning plate and staying therein accordingly.

In the aforementioned electric car jack, the upper end of the spindle of the second middle gear is formed into an angular tip and extended out of the upper chassis.

With the aforementioned structure, the present invention provides a component capable of producing a torque limitation effect and a component capable of producing a ratcheted braking effect, and both of these components are compatibly installed in a reduction gearbox of the machinery part of the electric car jack to maximize their effects.

DETAILED DESCRIPTION OF THE PREFERRED EMBODIMENTS

The technical characteristics, contents, advantages and effects of the present invention will be apparent with the detailed description of a preferred embodiment accompanied with related drawings as follows.

Figure 1:
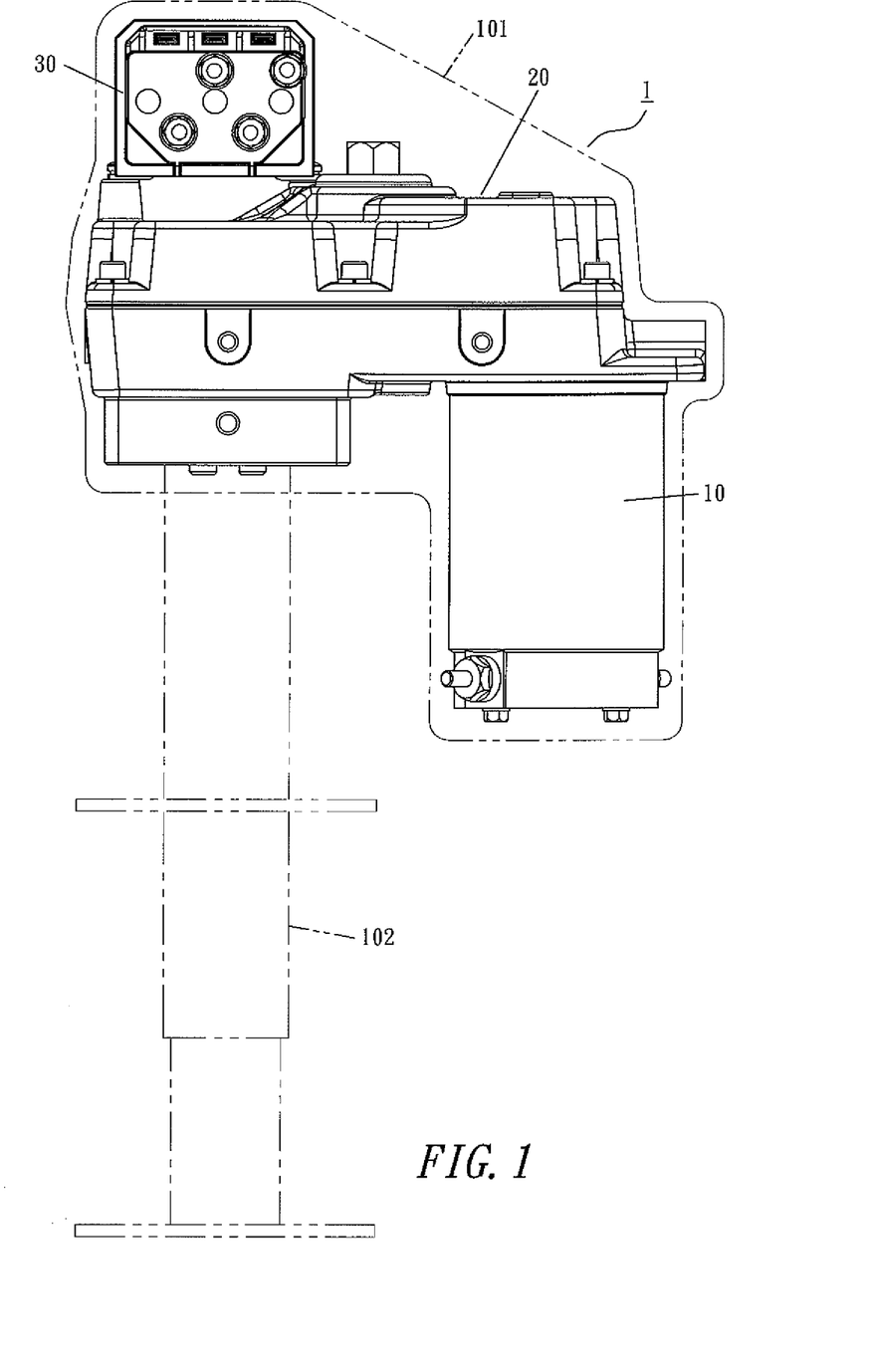
FIG. 1 is a schematic view of the major structure of a preferred embodiment of the present invention.
Figure 2:
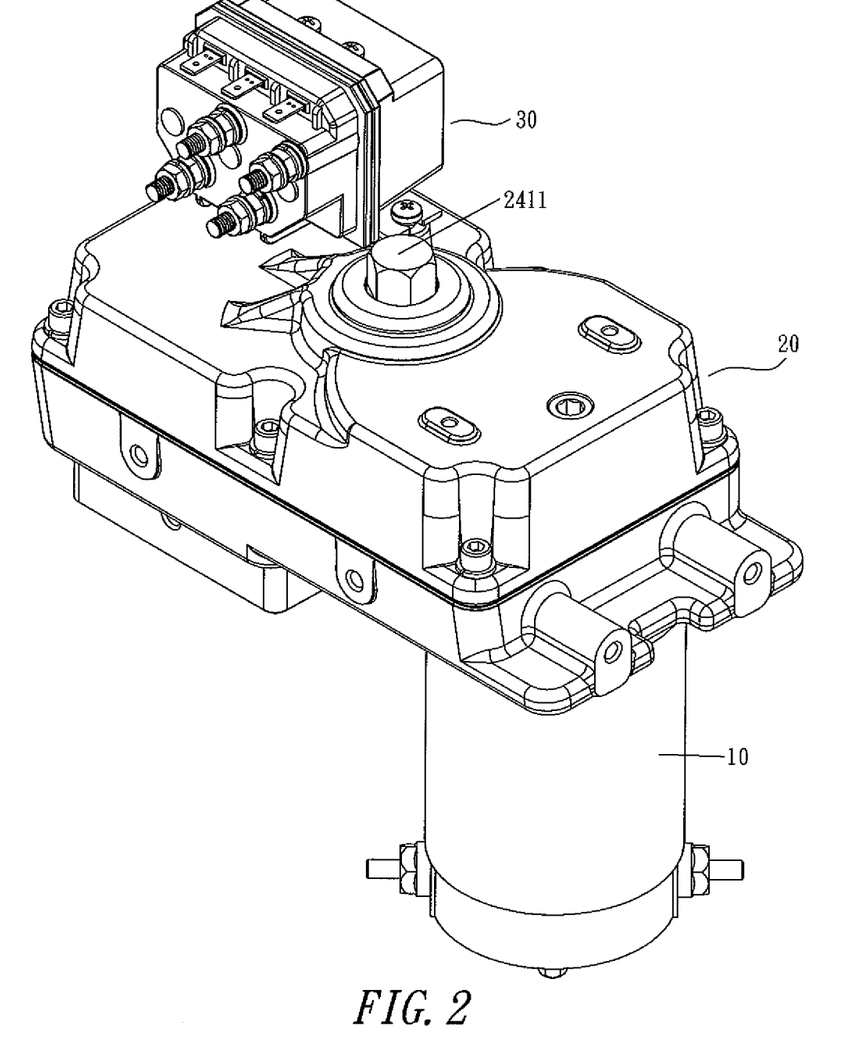
FIG. 2 is a perspective top view of machinery parts in an electric car jack of a preferred embodiment of the present invention.
Figure 3:
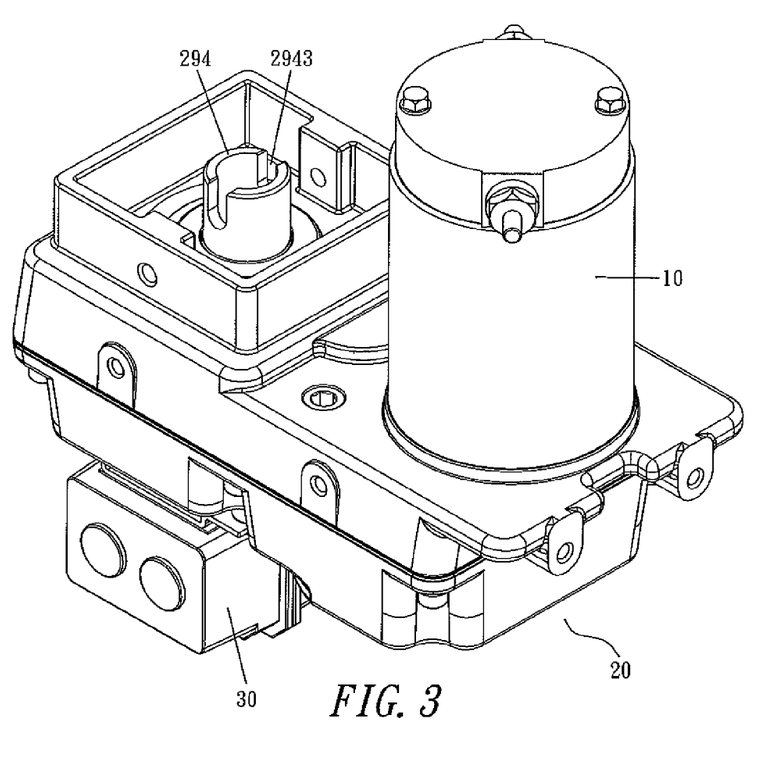
FIG. 3 is a perspective bottom view of machinery parts in an electric car jack of a preferred embodiment of the present invention.

With reference to FIG. 1 for an electric car jack 1 in accordance with a preferred embodiment of the present invention, the electric car jack 1 comprises a housing 101, having a telescopic stand 102 extended downwardly from the housing 101, and an interior space covered by the housing 101 is provided for installing a machinery part capable of produces the ascending and descending effects. In FIGS. 2 and 3, the machinery part comprises a power source 10 (preferably a DC motor), a reduction gearbox 20 and a controller 30.

Figure 4:
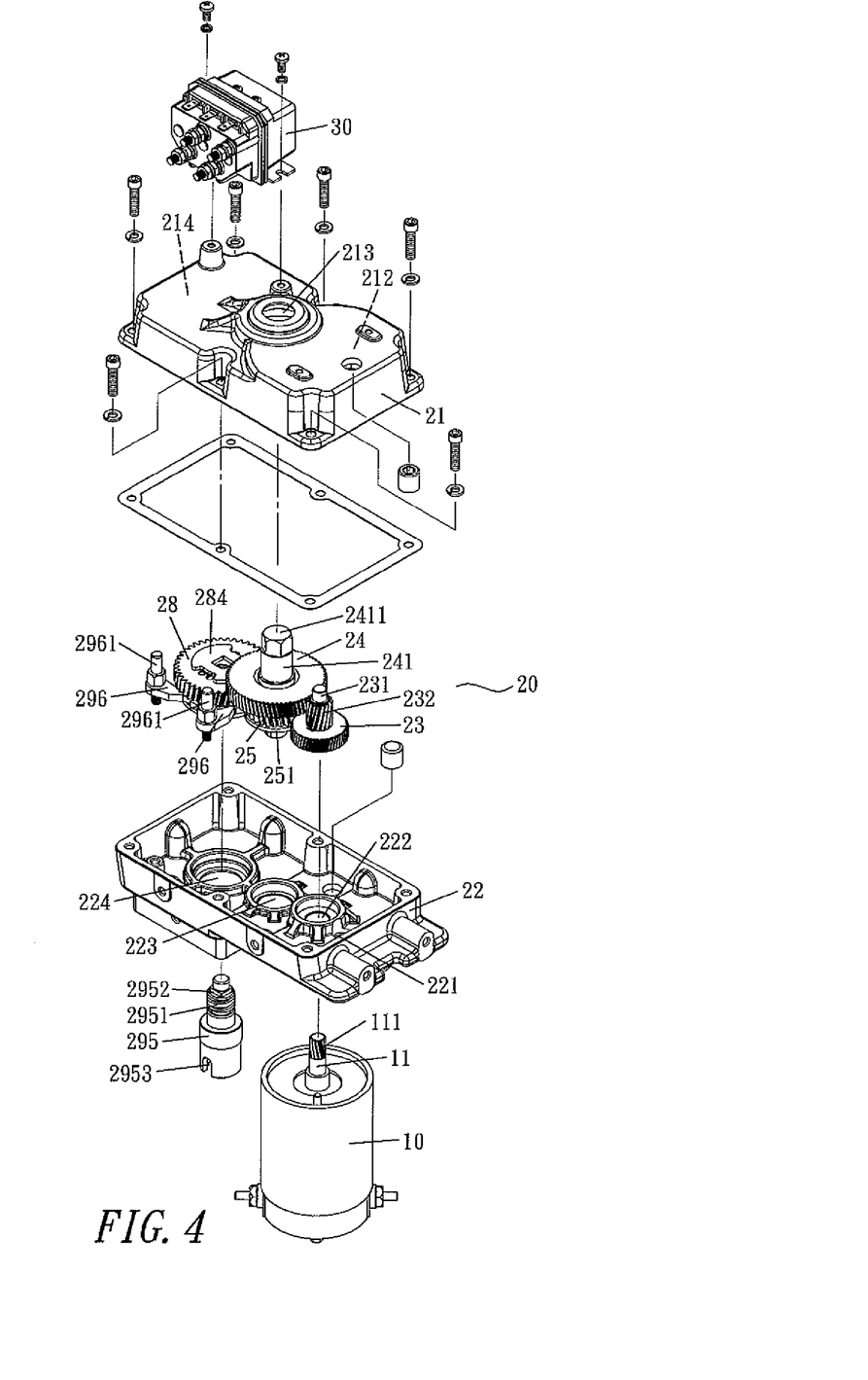
FIG. 4 is an exploded top view of machinery parts in an electric car jack of a preferred embodiment of the present invention.
Figure 5:
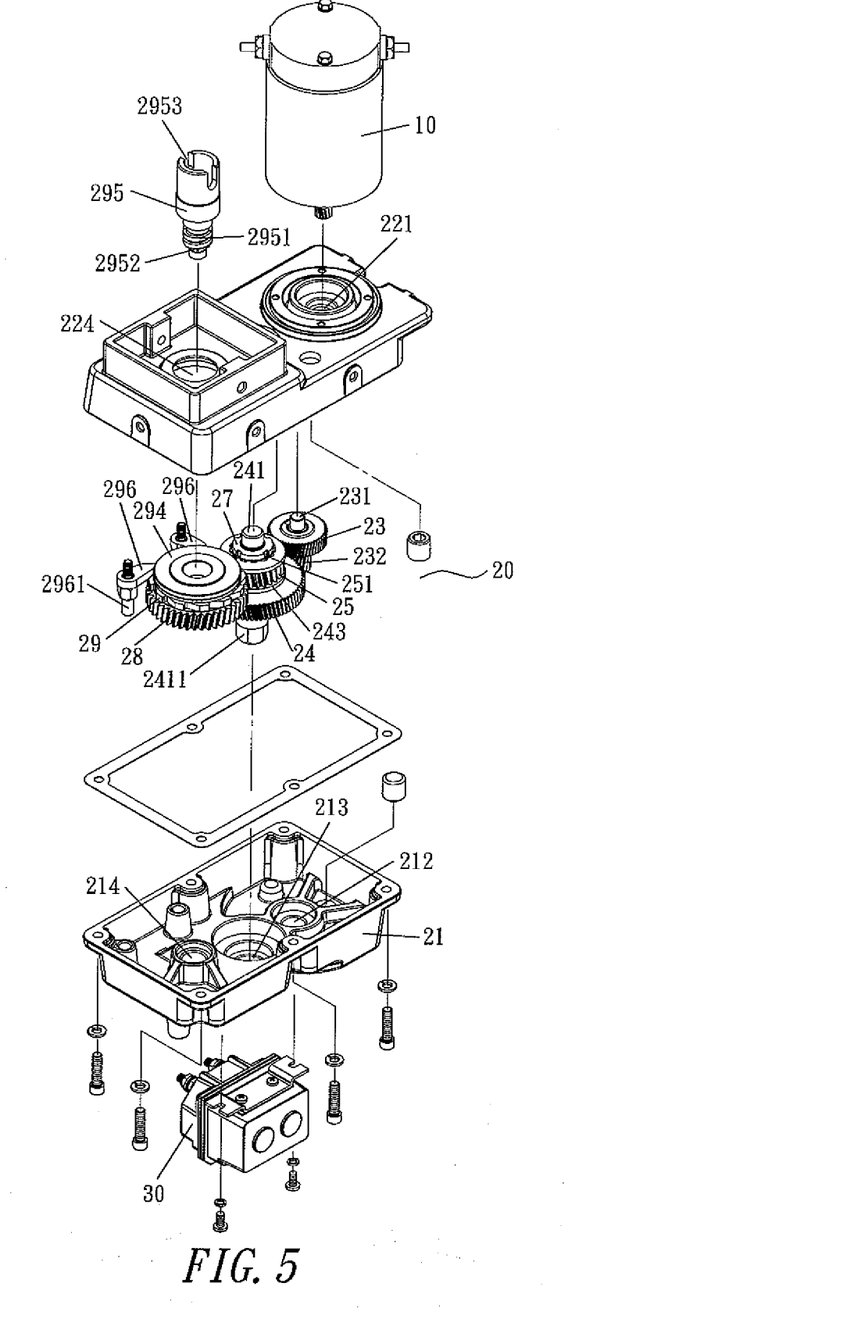
FIG. 5 is an exploded bottom view of machinery parts in an electric car jack of a preferred embodiment of the present invention.

In FIGS. 4 and 5, the power source 10 has an output shaft coupled to a power shaft 11, and a first-section pinion 111 disposed on a surface of the power shaft. The reduction gearbox 20 includes a chassis formed by engaging an upper chassis 21 and a lower chassis 22, and the interior space of the chassis is provided for installing a retardation mechanism (which will be described in more details) driven and rotated by the first-section pinion 111 of the power shaft 11. The upper chassis 21 comprises a first upper positioning cavity 212, an upper middle through hole 213 and a second upper positioning cavity 214, and the lower chassis 22 comprises a lower force-input perforation 221 (as shown in FIG. 5), a first lower positioning cavity 222, a second lower positioning cavity 223 and a lower force-output perforation 224.

Figure 6:
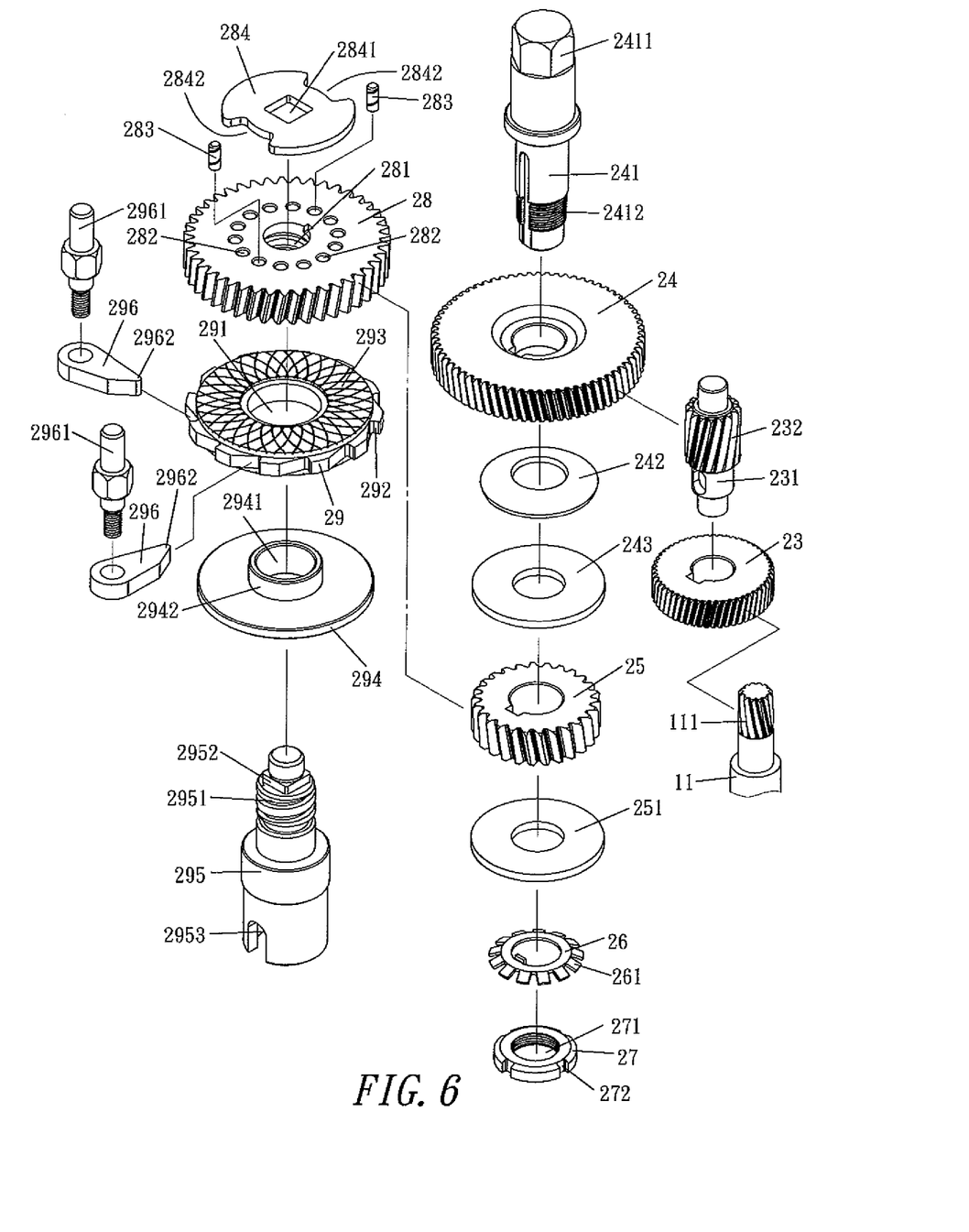
FIG. 6 is an exploded top view of a transmission structure of machinery parts in an electric car jack of a preferred embodiment of the present invention.
Figure 7:
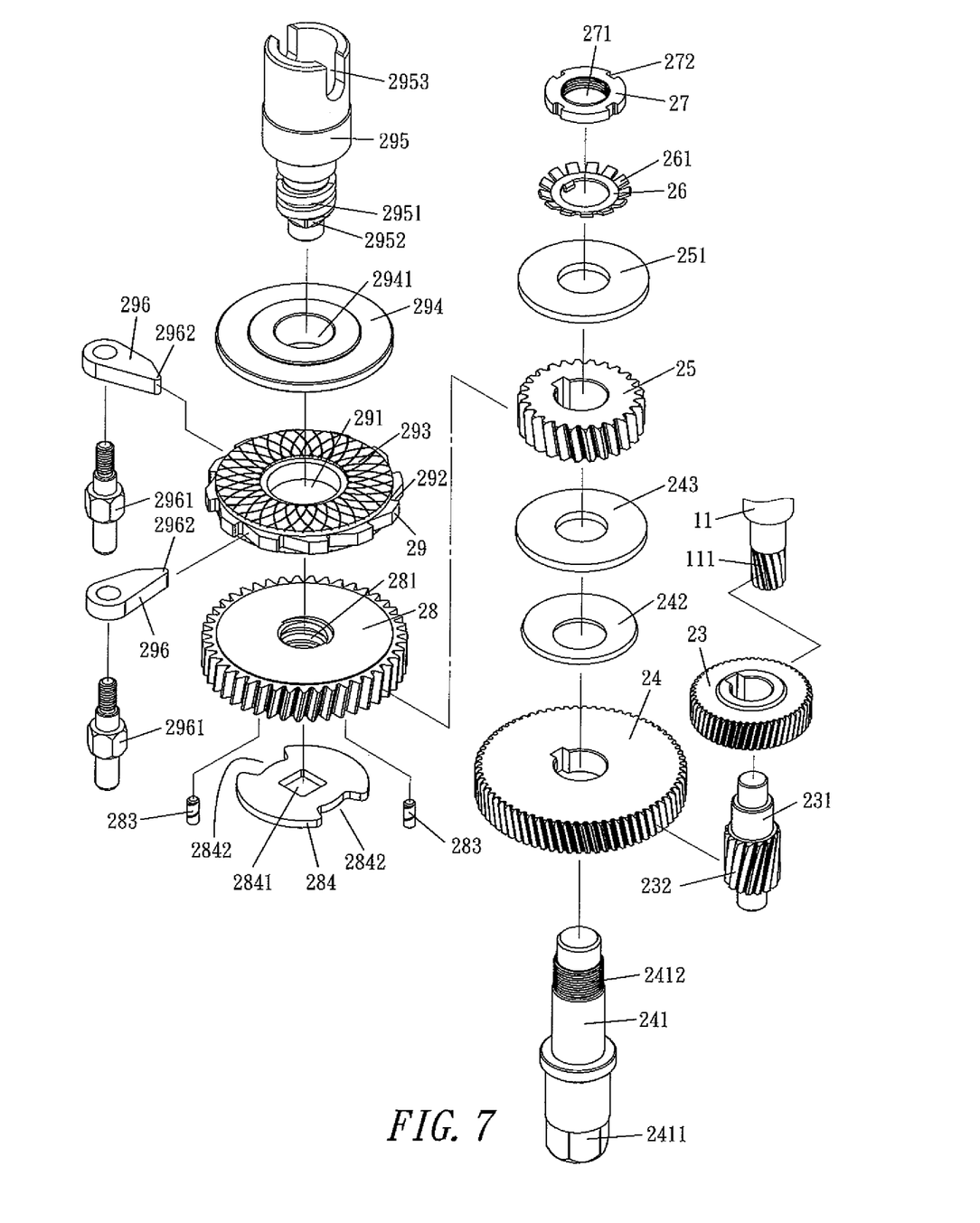
FIG. 7 is an exploded bottom view of a transmission structure of machinery parts in an electric car jack of a preferred embodiment of the present invention.

In FIGS. 6 and 7, the retardation mechanism comprises: a first middle gear 23 engaged and transmitted by the first-section pinion 111 and having a spindle 231 coupled to a second-section pinion 232 and rotated synchronously with the first middle gear 23; and a second middle gear 24 engaged and driven by the second-section pinion 232, and the spindle 241 of the second middle gear 24 is formed into an angular tip 2411, and the other end (or the lower end) has a thread section 2412 with an opposite outer thread. After the spindle 241 is installed to the second middle gear 24, the spindle 241 is passed through a concave arc elastic ring 242 and an upper lining 243 first, and then passed through a third middle gear 25, a lower lining 251 and an adjusting and a positioning ring 26, and finally screwed and coupled by a shaft hole 271 of a positioning screw ring 27 having an opposite inner thread and the thread section 2412. The external periphery of the adjusting and positioning ring 26 has a plurality of positioning plates 261 selectively deviated towards the positioning screw ring 27. The positioning screw ring 27 has a plurality of symmetrical positioning recesses 272 formed on the external periphery, and the positioning plates 261 selectively deviating, abutting and staying in the symmetrical positioning recesses 272.

Figure 8:
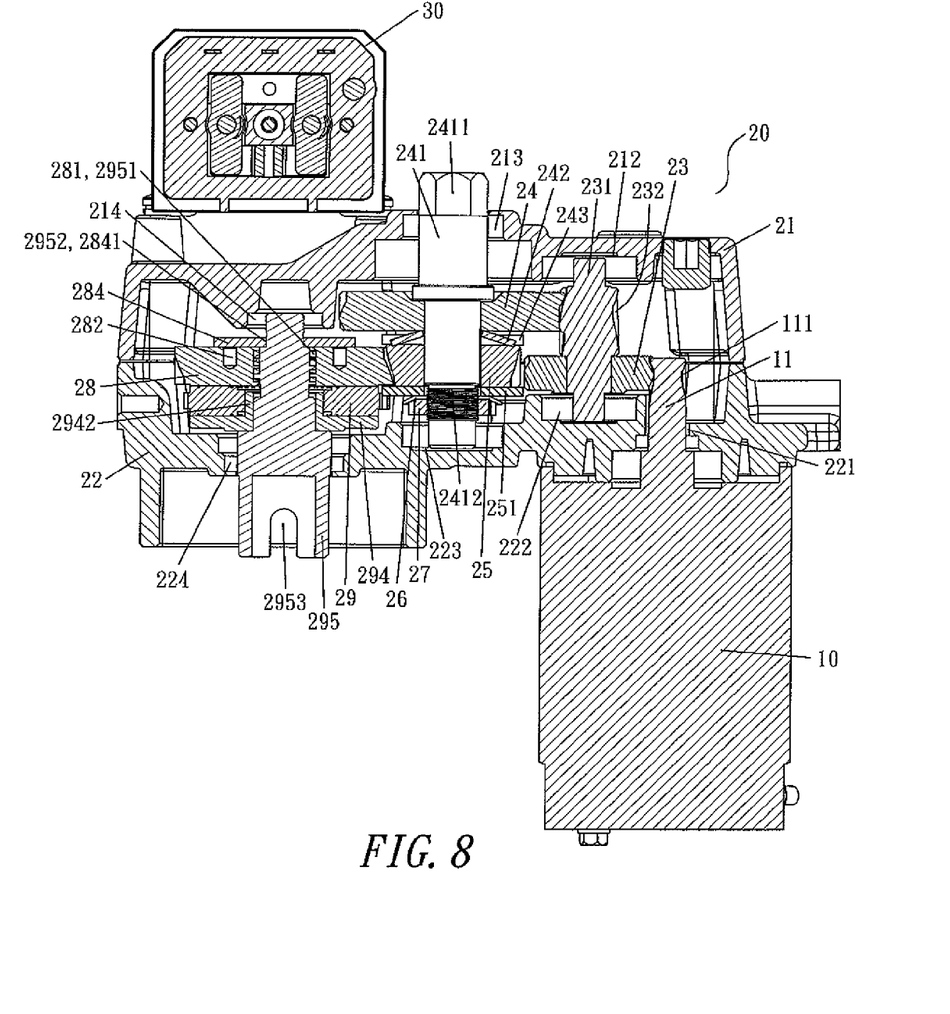
FIG. 8 is a sectional view of an assembly of a preferred embodiment of the present invention.

In FIGS. 6 and 7, a power gear 28 is engaged and driven by the third middle gear 25, and has a shaft hole 281 with opposite inner thread formed at the center of the power gear 28, and a plurality of positioning plug hole 282 formed at an upper surface of the power gear 28 and arranged into a circular shape, and provided for selectively plugging at least one positioning plunger 283. A positioning plate 284 is attached onto a top surface of the power gear 28 and has an angular perforation 2841 formed at the center of the positioning plate 284 and at least one arc groove 2842 formed at the periphery of the positioning plate 284. A brake disc 29 has a circular hole 291 formed at the center thereof, and a ratchet 292 disposed at the periphery of the brake disc 29 and having ratchet teeth arranged in the same direction, and a lining 293 being attached on both sides of the brake disc 29 for the braking purpose. A disc tray 294 has a protruding base 2942 formed around the periphery of a through hole 2941 at the center of the disc tray 294. When the disc tray 294 is attached onto the bottom side of the brake disc 29, the protruding base 2942 is pressed into the internal periphery of the circular hole 291 of the brake disc 29 (as shown in FIG. 8). An output shaft 295 includes an upper section comprised of a thread section 2951 with an opposite outer thread and an angular member 2952 provided for positioning, and an lower section which is an engaged slot 2953 coupled to the telescopic stand 102. The brake disc 29 has at least one latching member 296 disposed on a side of the brake disc 29 for plugging and positioning a shaft 2961, and the shaft 2961 is fixed between the upper and lower chasses 21, 22, so that the latching end 2962 of the latching member 296 is always aligned towards the ratchet 292, so that the brake disc 29 can be rotated in one direction only.

In FIG. 8, the upper chassis 21 and the lower chassis 22 are engaged and combined to form a chassis, and the power source 10 is connected to the lower chassis 22, and the power shaft 11 is extended into the chassis from the lower force-input perforation 221 of the lower chassis 22. The spindle 231 is accommodated between the first upper positioning cavity 212 and the first lower positioning cavity 222, and the first-section pinion 111 of the power shaft 11 is engaged with the first middle gear 23. After the spindle 241 is passed and installed to the second middle gear 24, the elastic ring 242, the upper lining 243, the third middle gear 25, the lower lining 251 and the adjusting and positioning ring 26, the spindle 241 is screwed and coupled to the shaft hole 271 of the positioning screw ring 27 and the thread section 2412 of the spindle 241, and then a lower end of the spindle 241 is accommodated in to the second lower positioning cavity 223, so that the angular tip 2411 at the top end is extended out of the upper middle through hole 213 (wherein a tool may be used to clamp the angular tip 2411 to rotate the spindle in order to lift or descend a compartment when there is a power disconnection or power failure). Now, the second middle gear 24 of the spindle 241 is engaged with the second-section pinion 232 of the spindle 231, and the positioning plate 284, the power gear 28, the brake disc 29 and the disc tray 294 are attached with each other sequentially. The protruding base 2942 of the disc tray 294 is pressed into the circular hole 291 of the brake disc 29, and jointly contained between the upper and lower chasses 21, 22. The latching end 2962 of the latching member 296 is pressed into the adjacent ratchet 292, and then the output shaft 295 is extended into the chassis through the lower force-output perforation 224 of the lower chassis 22 and passed through the through hole 2941 of the protruding base 2942 of the disc tray 294, and then the thread section 2951 is screwed and coupled to the shaft hole 281 of the power gear 28, and the angular member 2952 is entered precisely into the angular perforation 2841 of the positioning plate 284 and stays therein correspondingly. Now, the power gear 28 will be engaged with the third middle gear 25 of the spindle 241. Finally, the controller 30 is installed to the top of the upper chassis 21 and electrically coupled to the power source 10 for outputting a control signal via wired remote control or wireless remote control. After the control signal is received, determined and computed by the controller 30, an instruction is issued to the power source 10 to output power to drive the output shaft 295 to rotate in a forward or reverse direction, so as to push the telescopic stand 102 to extend downwardly (to push the compartment to ascend) or retract upwardly (to drive the compartment to descend).

In the assembling process of the electric car jack 1 of the present invention in a factory, the following must be selected and fixed. (1) The amount of screwing between the positioning screw ring 27 and the thread section 2412, and (2) The amount of screwing between the thread section 2951 and the shaft hole 281, wherein the selection of the amount of screwing between the positioning screw ring 27 and the thread section 2412 is based on the load capacity of the power source 10 to select the tolerable torque of the electric car jack 1, and the amount of screwing is directly proportional to the tolerable torque (but the tolerable torque must not be greater than the load capacity of the power source 10); and the selection of the amount of screwing between the thread section 2951 and the shaft hole 281 is to adjust the brake sensitivity whenever the electric car jack 1 has no power, and the amount of screwing is directly proportional to the brake sensitivity.

After the positioning screw ring 27 is rotated and the amount of screwing with the thread section 2412 is selected, the positioning plate 261 disposed on the adjusting and positioning ring 26 and adjacent to the positioning recess 272 is bent towards the positioning recess 272, so that the positioning screw ring 27 is abutted against at least one of the positioning recess 272 and cannot be moved, so as to fix the positioning screw ring 27 and the thread section 2412 in the screwed condition. Now, the elasticity of the adjusting and positioning ring 26 and the elastic ring 242 forces the second middle gear 24, the elastic ring 242, the upper lining 243, the third middle gear 25, the lower lining 251, the adjusting and positioning ring 26 and positioning screw ring 27 and the spindle 241 to be pushed and integrated into a synchronously rotating part. When the power drives and lifts the compartment, the second middle gear 24 is driven and transmitted by the second-section pinion 232, and the third middle gear 25 drives the power gear 28 and the output shaft 295 to rotate in a forward direction or a reverse direction in a normal operation as long as the torque falls within a tolerable range. If the torque produced by the weight of the compartment in an opposite direction is greater than the tolerable torque, the opposite torque drives the power gear 28 to rotate the third middle gear 25 powerfully in an opposite direction, so that operations with different directions or different speeds are produced between the third middle gear 25 and the second middle gear 24 to force the originally pushed and integrated part to be dissociated, so as to disconnect the power transmission between the third middle gear 25 and the second middle gear 24 and protect the power source 10 and prevent damages of the components during the transmission process.

After the amount of screwing between the thread section 2951 and the shaft hole 281 is selected, the angular perforation 2841 of the positioning plate 284 is sheathed on the angular member 2952 of the output shaft 295, and then the plunger 283 is plugged into an appropriate positioning plug hole 282. When a user operates the electric car jack 1 to output power to push and lift the compartment, the power gear 28 actively drives the output shaft 295 to rotate. Since there is the arc groove 2842, therefore the power gear 28 will be rotated in a very small angle first, and the connection between the thread section 2951 of the output shaft 295 and the shaft hole 281 becomes tighter, and thus the brake disc 29 and the disc tray 294 are forced to rotate synchronously. Now, the rotating direction of the brake disc 29 is capable of driving the ratchet 292 to push away the latching end 2962 of the latching member 296 to prevent the brake disc 29 from being latched. When the user operates the electric car jack 1 to output a power in an opposite direction to drive the compartment to descend slowly, the power gear 28 also actively drives and rotates the output shaft 295. Since there is the arc groove 2842, the power gear 28 will be rotated in a very small angle first, therefore the thread section 2951 of the output shaft 295 and the shaft hole 281 are separated slightly apart from each other, and the compressing effect among the brake disc 29, the power gear 28 and the disc tray 294 is released. Now, the rotating direction of the brake disc 29 is restricted by a latching end 2962 of the latching member 296 of ratchet 292 and the brake disc 29 cannot be moved. The compartment is driven by the power gear 28 and the output shaft 295 to descend slowly.

Regardless of lifting or descending the compartment, the power gear 28 can be stopped immediately when the user stops the power output. Now, the torque in an opposite direction produced by the weight of the compartment instantly drives the output shaft 295 to rotate in an opposite direction, so that the screwing connection between the thread section 2951 of the output shaft 295 and the shaft hole 281 will become tighter, and the brake disc 29 and the disc tray 294 are forced to compress each other, so that the torque in an opposite direction pushes the output shaft 295 to actively drive the power gear 28 to rotate in a direction such that the ratchet 292 of the brake disc 29 can be latched by the latching end 2962 of the latching member 296. In the situation when the power gear 28 stops rotating and the brake disc 29 is latched, the mutually compressed disc tray 294 and output shaft 295 are also latched to produce a brake effect without any buffering time, so as to assure the safety of the operation of the electric jack. After the brake, the electric car jack 1 can be operated to ascend or descend normally by the power as long as the power gear 28 is driven by the third middle gear 25 again, so that the braking effect can be released whenever there is a transmitted power, and the normal ascending or descending operation can be resumed.

From the description above, the present invention includes a torque limiting mechanism comprised of the spindle 241, the second middle gear 24, the elastic ring 242, the upper lining 243, the third middle gear 25, the lower lining 251, the adjusting and positioning ring 26 and the positioning screw ring 27 and capable of producing a torque limitation effect, and a powerless brake mechanism comprised of the positioning plate 284, the power gear 28, the brake disc 29, the disc tray 294, the output shaft 295 and the latching member 296 and capable of producing a ratcheted braking effect.

The present invention has the following advantages and effects:

1. The electric car jack of the present invention includes a torque limiting mechanism comprised of the spindle 241, the second middle gear 24, the elastic ring 242, the upper lining 243, the third middle gear 25, the lower lining 251, and the adjusting and positioning ring 26 and positioning screw ring 27 and provided for setting a torque limit which is smaller than the load capacity of the power source 10, so that the transmission of power can be stopped immediately when the torque limit is reached, and the utility of the power source always remains below its load capacity to prevent damages caused by over-current.

2. The electric car jack of the present invention includes a powerless brake mechanism comprised of the positioning plate 284, the power gear 28, the brake disc 29, the disc tray 294, the output shaft 295 and the latching member 296, and provided for achieving the effects of stopping and braking the electric jack immediately and facilitating users to operate the jack to lift a compartment to a specific height and stop the operation immediately when a desired height is reached.

3. The electric car jack of the present invention can be operated manually by clamping the angular tip 2411 exposed from the upper end of the spindle 241 and rotating the spindle 241 by a tool to ascend or descend a compartment, even if the battery is exhausted or the voltage is insufficient to start the power. In the manual operation, the effects of torque limitation and immediate braking are also offered.

In summation of the description above, the present invention has the component that produces the torque limitation effect and the component that produces the ratcheted braking effect, and these components are compatibly installed in a reduction gear of a machinery part of the electric car jack to maximize their effects and achieve the expected purposes. The present invention complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. An electric car jack, comprising: a housing, having a telescopic stand extended downwardly from the housing; a machinery part, installed in the interior space of the housing, and comprised of a power source, a reduction gearbox and a controller; a chassis, formed by engaging an upper chassis and a lower chassis of the reduction gearbox, and the power source being coupled to the lower chassis, and an output shaft of the power source being coupled to a power shaft and extending into the lower chassis, and the power shaft having a first-section pinion disposed on a surface of the power shaft, and the controller being installed at the top surface of the upper chassis and electrically coupled to the power source, and the reduction gearbox having a retardation mechanism installed therein, characterized in that the retardation mechanism comprises:

a first middle gear, engaged and transmitted by the first-section pinion, and having a spindle installed between the upper chassis and the lower chassis, and a second-section pinion coupled to the spindle;

a second middle gear, engaged and transmitted by the second-section pinion, and having a spindle installed between the upper chassis and the lower chassis, and a thread section formed on a surface of a lower end of the second middle gear, and the spindle passing through a concave arc elastic ring and an upper lining after the spindle is passed into the second middle gear, and then the spindle passing through a third middle gear, a lower lining and an adjusting and positioning ring, and a positioning screw ring having a shaft hole with an inner thread and screwed with the thread section, and the adjusting and positioning ring having a plurality of positioning plates disposed at the external periphery of the adjusting and positioning ring and selectively deviated, and the positioning screw ring having a plurality of symmetrical positioning recess formed on the external periphery of the positioning screw ring;

a power gear, engaged and transmitted by the third middle gear, and having a shaft hole formed at the center of the power gear and an inner thread formed in the shaft hole, and a plurality of positioning plug holes formed on an upper surface of the power gear and arranged in a circular shape and provided for selectively plugging at least one positioning plunger;

a positioning plate, attached onto a top surface of the power gear, and having an angular perforation formed at the center of the positioning plate and at least one arc groove formed at the periphery of the positioning plate;

a brake disc, having a circular hole formed at the center of the brake disc, a ratchet disposed around the periphery of the brake disc and having ratchet teeth arranged in the same direction, and a lining separately attached onto both sides of the brake disc;

a latching member, positioned by plugging a shaft, installed at a side of the brake disc and fixed between the upper chassis and the lower chassis, and having a latching end always aligned towards the ratchet, such that the brake disc is capable of rotating in one direction only;

a disc tray, having a protruding base formed at the center of the disc tray and around a through hole, and the disc tray being attached onto a bottom surface of the brake disc, and the protruding base abutting the internal periphery of the circular hole of the brake disc; and an output shaft, having an upper section comprised of a thread section with an opposite outer thread and an angular member, and a lower section coupled to the telescopic stand, and the output shaft extending from a through hole formed at a bottom side of the lower chassis and passing through the through hole in the protruding base of the disc tray, and then the thread section being screwed and coupled with the shaft hole of the power gear, and the angular member entering into the angular perforation of the positioning plate and staying therein accordingly.

2. The electric car jack of claim 1, wherein the upper end of the spindle of the second middle gear is formed into an angular tip.

3. The electric car jack of claim 1, wherein the upper end of the spindle of the second middle gear is formed into an angular tip and extended out of the upper chassis.

4. The electric car jack of claim 2, wherein the upper end of the spindle of the second middle gear is formed into an angular tip and extended out of the upper chassis.

* * * * *